(12) United States Patent
Hu et al.

(10) Patent No.: US 9,229,797 B1
(45) Date of Patent: Jan. 5, 2016

(54) DEFERRED DRIVE PROCESSING

(71) Applicant: EMC Corporation, Hopkinton, MA (US)

(72) Inventors: Zhipeng Hu, Beijing (CN); Jian Gao, Beijing (CN); Wei He, Chengdu (CN); Hongpo Gao, Beijing (CN); Marc Cassano, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 182 days.

(21) Appl. No.: 14/141,310

(22) Filed: Dec. 26, 2013

(51) Int. Cl.
*G06F 11/00* (2006.01)
*G06F 11/07* (2006.01)

(52) U.S. Cl.
CPC .................................. *G06F 11/0727* (2013.01)

(58) Field of Classification Search
USPC ............................................ 714/6.2, 6.1, 5.1
See application file for complete search history.

(56) References Cited

U.S. PATENT DOCUMENTS

| 8,782,463 | B1* | 7/2014 | Singh | G06F 11/1469 714/6.22 |
| 8,782,465 | B1* | 7/2014 | Foley | G06F 11/1443 714/6.21 |
| 8,853,781 | B2* | 10/2014 | Cheng | H01L 29/66795 257/347 |
| 2002/0178396 | A1* | 11/2002 | Wong | G06F 11/0709 714/4.11 |
| 2013/0326266 | A1* | 12/2013 | Chen | G06F 11/2089 714/6.3 |

* cited by examiner

*Primary Examiner* — Sarai Butler
(74) *Attorney, Agent, or Firm* — Muirhead and Saturnelli, LLC

(57) ABSTRACT

Techniques for a method of processing events are described. A first notification is received regarding an occurrence of a first event identifying a first physical drive coming online. It is determined whether the first event is dependent on one or more other events that have not yet occurred. If it is determined that the first event depends on one or more other events that have not yet occurred, performing first processing to defer processing of the first event until the one or more other events have occurred. If it is determined that the first event does not depend on the one or more other events that have not yet occurred, the first event is processed.

20 Claims, 7 Drawing Sheets

DEFERRED DRIVE PROCESSING

BACKGROUND

1. Technical Field

This application generally relates to event processing.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the data storage system through a plurality of channels provided therewith. Host systems provide data and access control information through the channels and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored in the storage system. In order to facilitate sharing of the data on the data storage system, additional software on the data storage systems may also be used.

SUMMARY OF THE INVENTION

In accordance with one aspect of the invention is a method of processing events comprising: receiving a first notification regarding an occurrence of a first event identifying a first physical drive coming online; determining whether the first event is dependent on one or more other events that have not yet occurred; if it is determined that the first event depends on the one or more other events that have not yet occurred, performing first processing to defer processing of the first event until the one or more other events have occurred; and if it is determined that the first event does not depend on the one or more other events that have not yet occurred, processing the first event. The drive online notification may be generated in response to a drive being inserted into a drive slot or a drive in the drive slot recovering from an error state. The first processing may include creating a first entry in a first of a plurality of deferred drive processing queue and the first entry may identify the first event and the first physical drive. The plurality of deferred drive processing queues may be associated with a plurality of types of drive events. Each of the plurality of deferred drive processing queues may be associated with a different one of the plurality of types of drive events. The first deferred drive processing queue may be associated with a first type of drive event included in the plurality of types of drive events. Placing the first entry in the first deferred drive processing queue may indicate that the processing of the first event and first physical drive depends on an occurrence of a second event of the first type of drive event. The method may include receiving a second notification regarding an occurrence of a second event of the first type of drive event; determining whether any event having a corresponding entry in the first deferred drive processing queue is able to be processed as a result of the second event occurring; and if it is determined that an event having a corresponding entry in the first deferred drive processing queue is able to processed as a result of the second event occurring, placing the event able to now be processed in a drive processing queue for processing. Determining whether the first event having the first entry in the first deferred drive processing queue is able to be processed as a result of the second event occurring may include determining whether first information regarding the first event matches second information regarding the second event. The plurality of types of drive events may include any of a new system drive event, a sparing event, and a new user drive event. The first type of drive event may be a sparing event, and the second notification may be generated responsive to a sparing event occurrence whereby a spare physical drive automatically replaced another physical drive that was previously configured as a member of a RAID group for storing user data. The first type of drive event may be a new system drive event and the second notification may be generated responsive to a new physical drive being inserted into a system drive slot for use as a system drive in a data storage system. The first type of drive event may be a new user drive event and the second notification may be generated responsive to a new physical drive being inserted into a user drive slot for use as a user drive in a data storage system. The new physical drive may be configured as a drive of a RAID group for storing user data thereby making the new physical drive a consumed user drive. The system drive may be used internally by the data storage system and may not store user data. The first entry may identify the first event and the first physical drive may include any of a serial number identifying the first physical drive, a capacity of the first physical drive, information identifying a drive type of the first physical drive, information identifying whether the first physical drive is inserted in a system drive slot or a user drive slot, and a physical slot location in which the first physical drive is inserted.

In accordance with another aspect of the invention is a computer readable medium comprising code thereon for processing events, the computer readable medium comprising code for: receiving a first notification regarding an occurrence of a first event identifying a first physical drive coming online; determining whether the first event is dependent on one or more other events that have not yet occurred; if it is determined that the first event depends on the one or more other events that have not yet occurred, performing first processing to defer processing of the first event until the one or more other events have occurred; and if it is determined that the first event does not depend on the one or more other events that have not yet occurred, processing the first event. The drive online notification may be generated in response to a drive being inserted into a drive slot or a drive in the drive slot recovering from an error state. The first processing may include creating a first entry in a first of a plurality of deferred drive processing queues, the first entry identifying the first event and the first physical drive. The plurality of deferred drive processing queues may be associated with a plurality of types of drive events. Each of the plurality of deferred drive processing queues may be associated with a different one of the plurality of types of drive events. The first deferred drive processing queue may be associated with a first type of drive event included in the plurality of types of drive events and placing the first entry in the first deferred drive processing queue may indicate that the processing of the first event and first physical drive depends on an occurrence of a second event of the first type of drive event. The computer readable medium may further comprise code for: receiving a second notification regarding an occurrence of a second event of the first type of drive event; determining whether any event having a corresponding entry in the first deferred drive processing queue is able to be processed as a result of the second event occurring; and if it is determined that an event having a corresponding entry in the first deferred drive processing queue is able to processed as a result of the second event occurring, placing the event able to now be processed in a drive processing queue for processing, and wherein determining whether the first event having the first entry in the first deferred drive processing queue is able to be processed as a result of the second event occurring includes determining whether first information regarding the first event matches second information regarding the second event.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
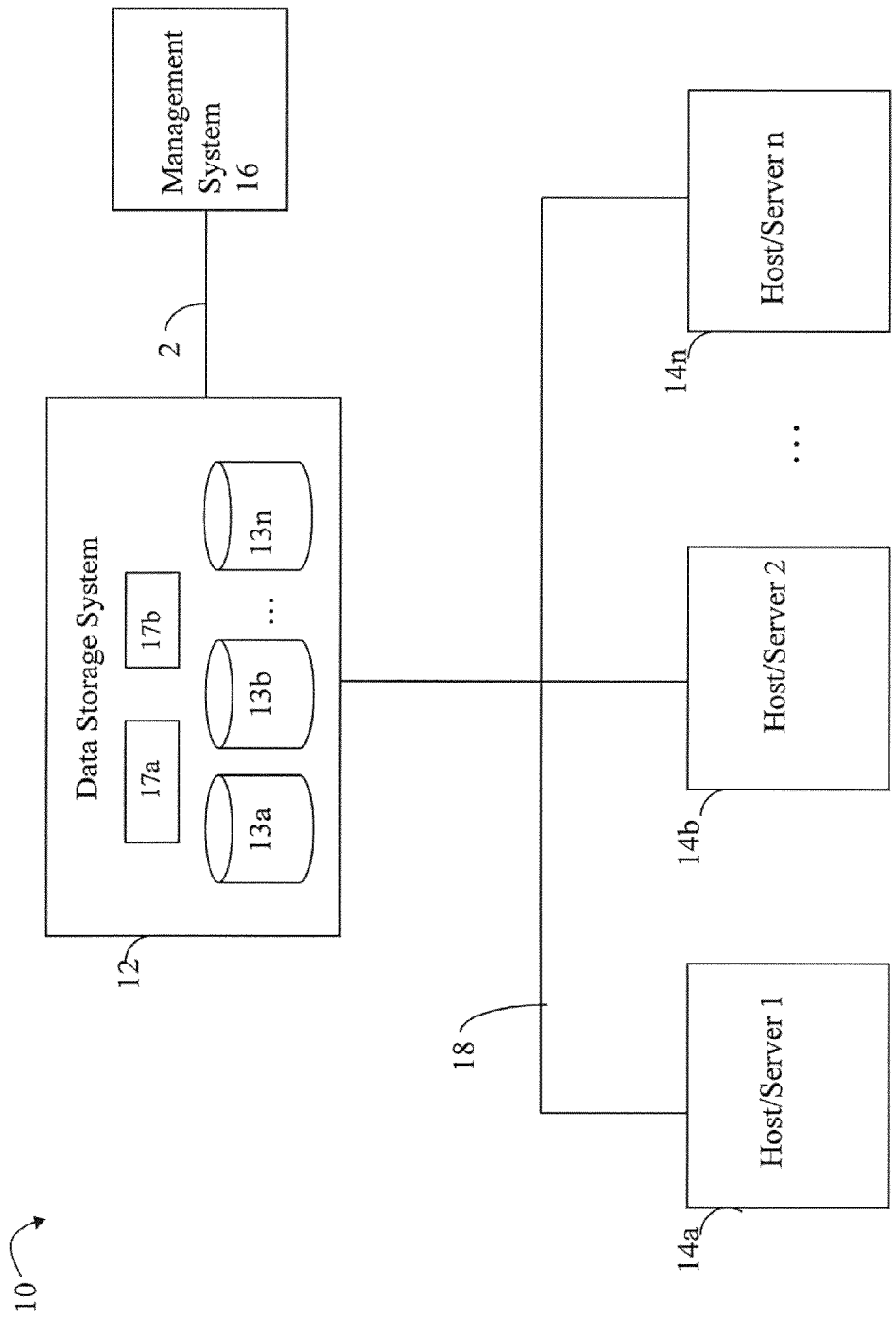
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
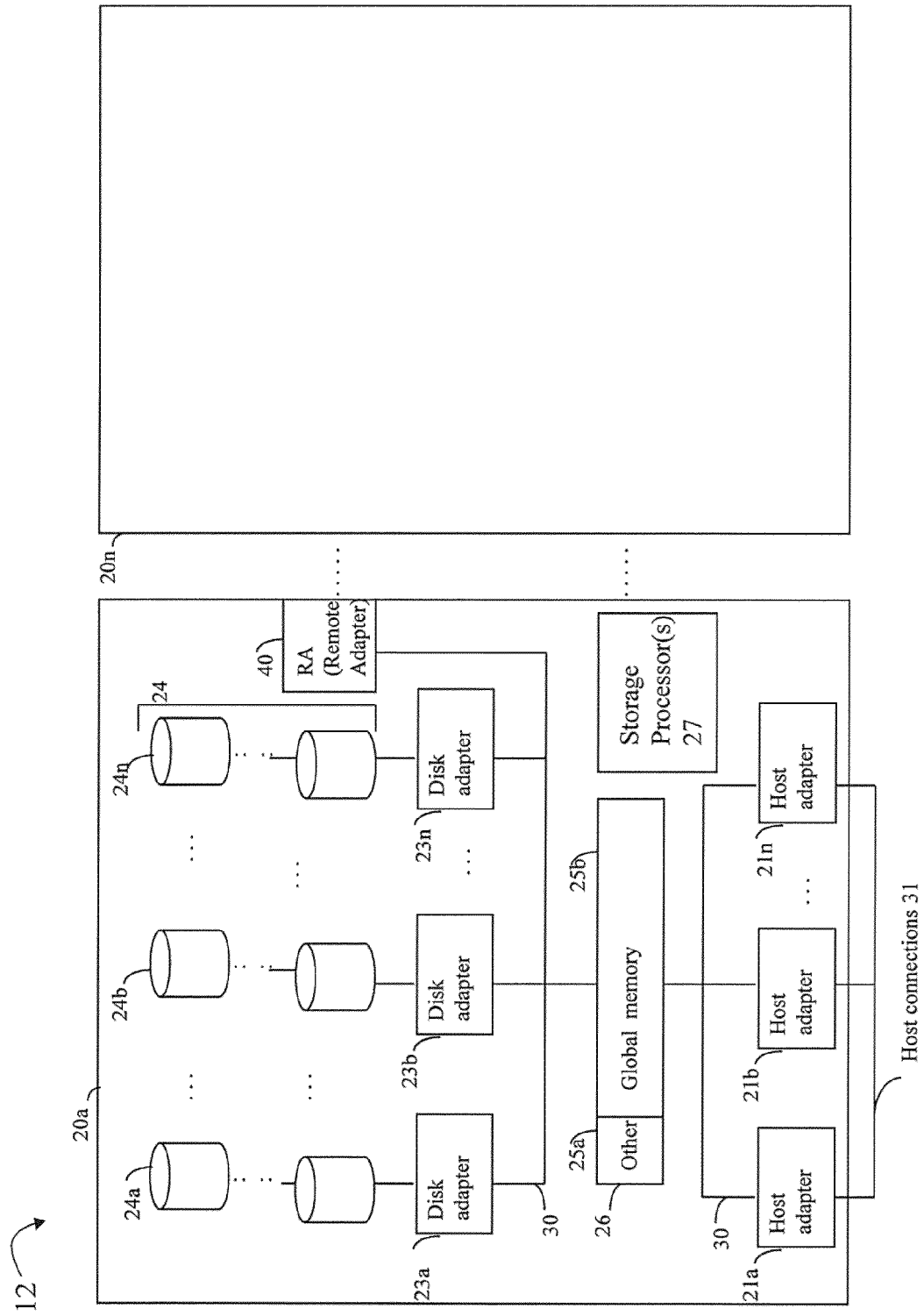
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors (SPs) 27 may be a CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

In general, a storage area network (SAN) may be characterized as a collection of data storage systems that are networked together via a switching fabric to a number of host computer systems operating as servers such as illustrated in FIG. 1.

In a data storage system, or more generally any system, multiple events for one or more resources may occur that are related to one another. If the data storage system processes events independently for a single resource, such as a single drive, and does not associate such related events with one another across possibly multiple drives, undesirable and/or inconsistent results may occur. For example, a user may experience confusing or inconsistent resulting behavior. An example relates to events that may occur in a data storage system in connection with physical devices or drives. Events related to drives may be processed independently. For example, code executing in a data storage system may receive a notification in connection with various drive events such as when a drive comes online. When such software receives the online notification of a drive, the online event notification for the particular drive may be processed independently considering only event that have occurred or may occur for the single drive without also considering events that may occur or have occurred in connection with other drives. A drive online notification may be generated, for example, in response to inserting a drive into a physical drive slot or in response to a drive already in the slot recovering from an error state.

In some instances, events that occur across multiple drives are related and need to be considered for consistent and proper handling. As related to multiple drives, if such related or associated events across multiple drives are not properly recognized and handled, in some instances, a user may experience inconsistent results for the same operation thereby leading to confusion and inconsistency. In other instances, the results may have adverse consequences that are more severe, such as unavailability of user data and/or loss of user data.

In following paragraphs, illustrations and examples may refer to a particular data storage system, such as the VNX™ data storage system by EMC Corporation. However, such particulars are only for purposes of examples provided herein. It will be appreciated by those skilled in the art that techniques described herein have broader applicability and should not be construed as limited by details of description herein.

In order to avoid such possible inconsistencies and undesirable adverse consequences, an embodiment in accordance with techniques herein may use perform processing to detect and appropriately process related events. In particular, in a data storage system whereby such related events may be associated with different physical drives, a technique of deferred drive processing may be performed. For example, as described in more detail in following paragraphs, when data storage system software receives a drive online event notification and it cannot be determined how to process the event notification appropriately, the processing of the event occurrence for the drive may be deferred until another related event, for the same or a different drive, occurs.

Before describing deferred drive processing, discussion in following paragraphs initially describes sparing that may be performed in a data storage system and also processing that may be performed in a data storage system to avoid data loss. Additionally, some examples are provided in which inconsistent results may occur in a data storage system which does not utilized deferred drive processing techniques described herein.

Figures 3A, 3B:
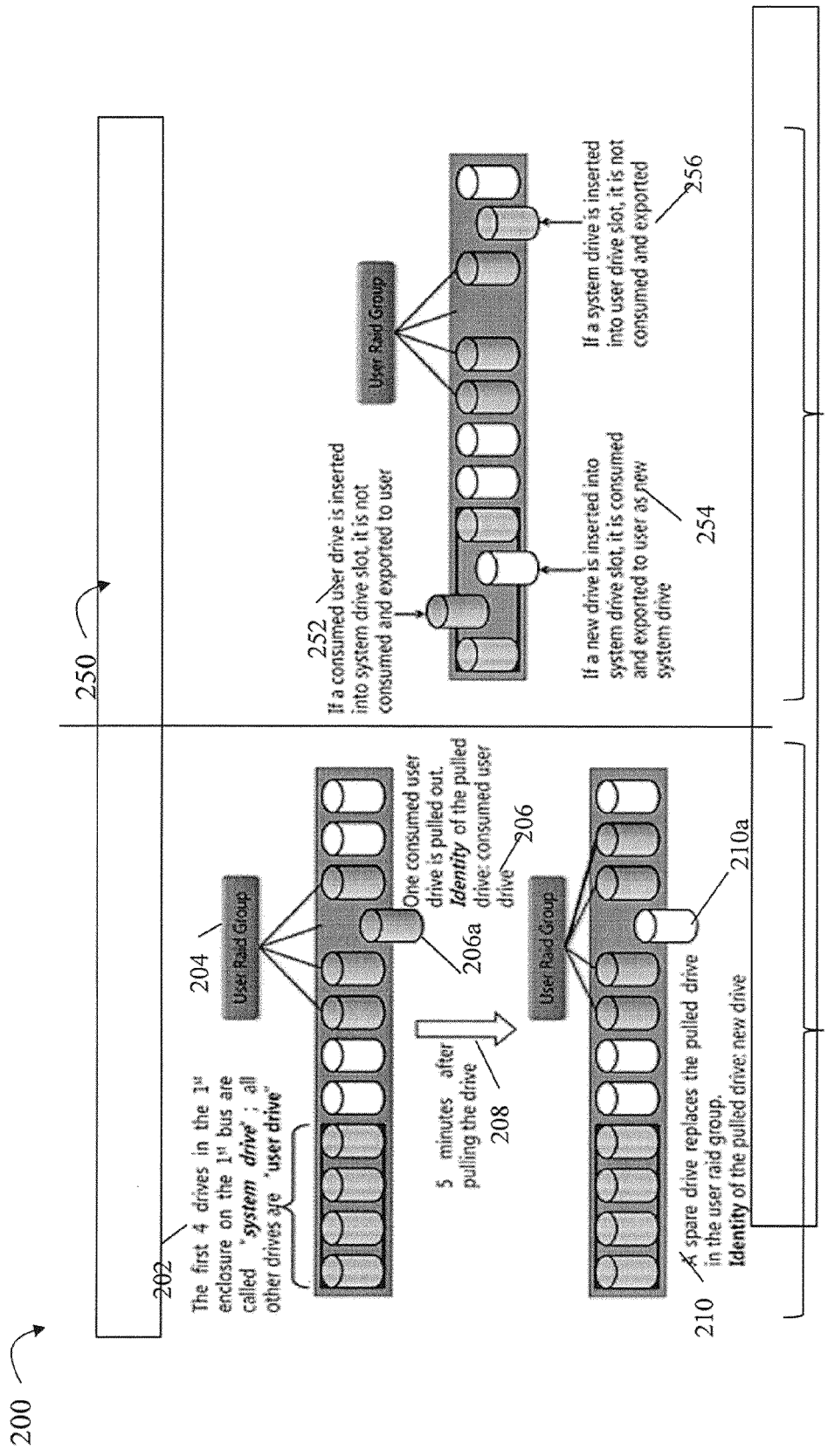
FIGS. 3A and 3B are examples illustrating features and associated processing that may be performed in an embodiment in accordance with techniques herein.

Referring to FIG. 3A, shown is an example illustrating sparing that may be performed in an embodiment in accordance with techniques herein. Drives in a data storage system may be characterized as a system drive or a user drive. A system drive may store data used internally and privately within the data storage system and a system drive may not be used to store user data, such as may be written by a host or other client of the data storage system. The system drives may, for example, include boot code for booting the data storage system.

User drives may be used to store user data, such as used by a host or other client of the data storage system. I/O requests, such as from a host, may be received at the data storage system whereby such I/O requests (e.g., read and/or write requests) may be directed to user drives. In a data storage system, system drives may be located in predetermined or expected physical locations within the data storage system disk enclosure. Additionally, a data storage system may include a predetermined number of system drives. For example, in one data storage system, there may be 4 system drives located in the first disk enclosures on the first bus. Remaining drives may be user drives. Element 204 denotes that user drives may be consumed or provisioned for storing user data.

As used herein, a consumed user drive may refer to a user drive positioned in a user drive slot that has been provisioned for storing user data such as a result of configuring the user drive as a member of a RAID group used for storing user data. A user drive may be referred to as a consumed user drive, if the drive in the user slot is configured as a RAID group member just described. A user drive may alternatively be referred to as an unconsumed user drive if the drive is in the user drive slot but the drive is however not yet configured as a RAID group member.

At a first point in time, a consumed user drive 206a may be removed or physically pulled out of its slot in the data storage system. Some time after removing the consumed user drive 206a, such as 5 minutes later, the data storage system software may perform processing to select a spare drive to replace the consumed user drive 206a. The spare drive is then recognized as a user drive. Processing may be performed to store an initial set of user data on the spare drive 210a such as by performing internal RAID group processing so that the spare drive includes data consistent with its position as a member drive of the RAID group and thereafter may be used to service I/O operations directed to the RAID group.

After the spare drive is recognized as a new user drive of the RAID group, the previously pulled drive 206a loses its identity as a user drive and is no longer recognized by the system as a user drive. If drive 206a is again inserted into one of the drive slots, system drive slot or user drive slot, the data storage system may recognize drive 206a as a new drive (e.g. not recognized as a system drive and also not recognized as a user drive).

Referring to FIG. 3B shown is an example illustrating processing that may be performed in an embodiment in accordance with techniques herein such as to avoid data loss. Element 252 illustrates that if a consumed user drive is inserted into a system drive slot, the data storage system may not utilize the drive as a system drive. The foregoing of 252 may be performed to avoid losing user data stored on the consumed user drive that may have been mistakenly inserted into a system drive slot. Element 256 illustrates that if a system drive is inserted into a user drive slot, the system drive may not be consumed as a user drive. The foregoing of 256 may be performed to avoid losing system data that may be stored on the system drive mistakenly inserted into a user drive slot. Element 254 illustrates that if a new drive is inserted into a system drive slot, it may be consumed and used as a system drive.

It should be noted that a first drive inserted into a user drive slot location may be recognized as a system drive based on its identity and prior use as a system drive. For example, at a first point in time, the first drive may be inserted into a system drive slot and used for storing system data. The first drive may be identified based on an identifier (e.g., serial number) and/or other identifying information uniquely associated with the physical first drive. At the first point in time, the data storage system may store information denoting the first drive as a system drive. At a second later point in time, that same first drive having the same identifier may be detected in a user drive slot location. The data storage system may detect that the occurrence of 256 based on the previously stored information regarding the first drive's usage as a system drive. In a similar manner, the data storage system may detect the occurrence of 252 by storing information regarding the identity of the particular physical drives provisioned and configured into RAID groups for user data storage. A new drive may be a physical drive that is not otherwise recognized in the data storage system as being a system drive or a user drive, such as based on prior usage within the data storage system.

Figure 4:
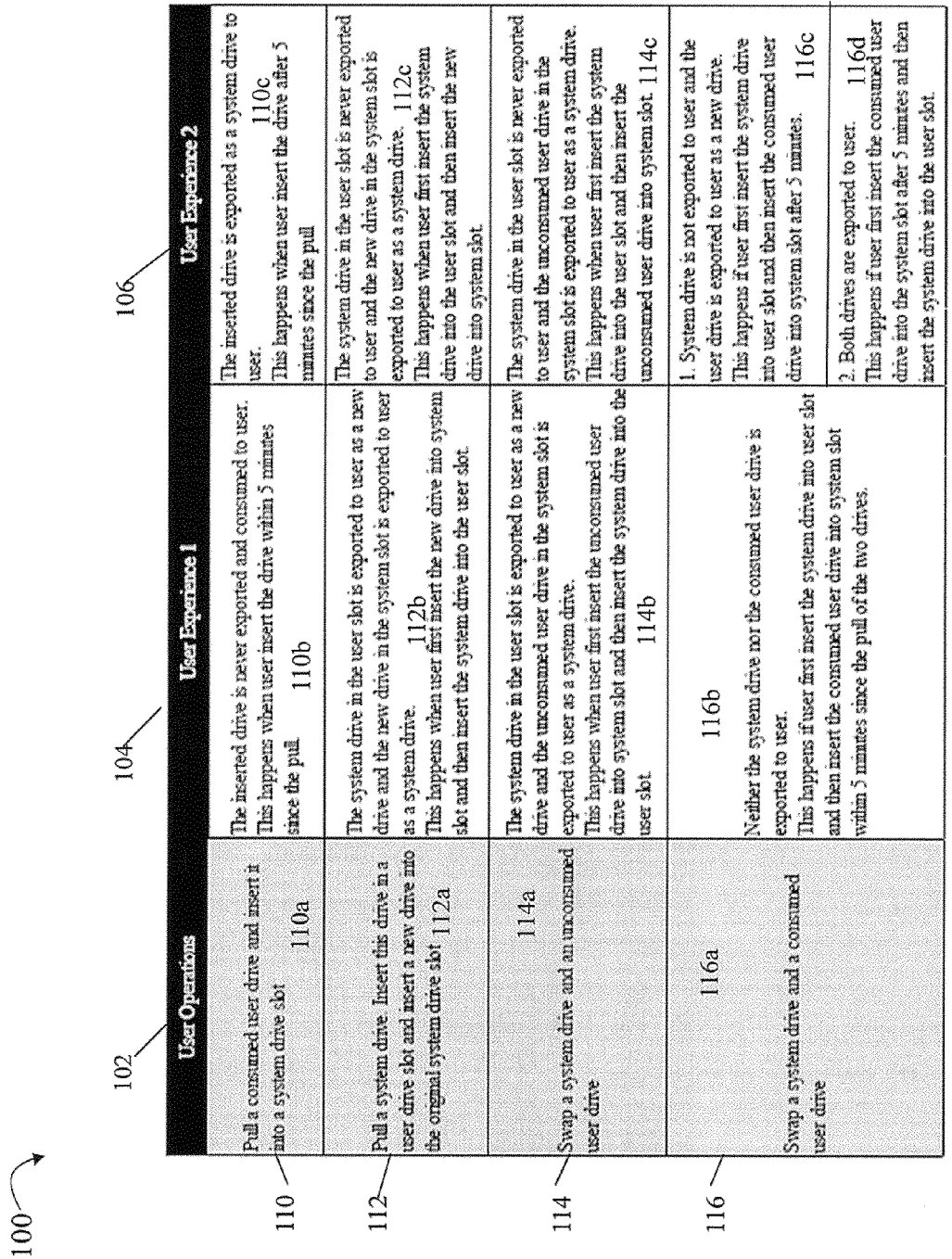
FIG. 4 is an example of different scenarios or cases and different results that may be obtained in a data storage system not utilizing techniques herein.

In an embodiment not utilizing the deferred drive processing techniques described below in more detail, events for different drives may be processed independently. That is, when the data storage system software receives an event notification for one drive (e.g., event notification regarding occurrence of the drive coming online, or notification regarding some drive activity occurring for the one drive such as sparing), processing for the event may be performed (e.g. sparing) with respect to only the single one drive, such as using the single drive's information (e.g., serial number, capacity, location, etc.) and such processing may not check events or information of any other drives. Users may have confusing experiences and results due to possible inconsistent different behaviors for the same drive operation, and even possibly data loss. To further illustrate such problems that may arise in an embodiment not in accordance with techniques herein, consider the table 100 of FIG. 4 with various examples of different results that may be obtained responsive to performing the same or similar operations.

The following examples may be consistent with a data storage system which also performs processing consistent with discussions above regarding functionality of FIGS. 3A and 3B.

The table 100 includes 4 example cases or scenarios that may occur. Each of the four cases is represented by information in a single row of table 100. Table 100 includes a first column 102 identifying the user operations performed for the particular case, a second column 104 identifying a first result or behavior responsive to the user operations indicated in column 102 of the same row, and a third column 106 identifying a second different result or behavior responsive to the user operations indicated in column 102.

With reference to the first case corresponding to 110, the user operation 110a may be to pull a consumed user drive and insert the consumed user drive into a system slot. Element 110b indicates that the user experiences a first result if the insertion of the consumed user drive into the system drive slot occurs within an amount of time that is less than a predetermined amount of time, and element 110c indicates that the user experiences a second different results if the insertion occurs after the foregoing predetermined amount of time has elapsed. The predetermined amount of time may be, for example 5 minutes. After the predetermined amount of time has elapsed, the system automatically replaces the pulled consumed user drive of the RAID group with a new spare drive such as described in connection with FIG. 3A.

As indicated by 110b, when the user drive (such as belonging to a configured RAID group) is pulled and inserted into a system drive slot within the predetermined amount of time, the system has not yet replaced the pulled user drive with a spare drive. When the system software receives a drive online notification due to the insertion of the user drive into the system slot and the predetermined amount of time has not elapsed, the system may determine that the inserted drive's identity is a consumed user drive and may therefore not export the inserted drive for use as a system drive. Eventually, the predetermined amount of time elapses and the system may automatically replace the pulled user drive of the RAID group with a new spare drive. However, since events for the drives are processed independently, the consumed user drive inserted into the system drive slot is not checked when processing eventually replaces the consumed user drive of the RAID group with the spare drive. In this manner, the pulled user drive which has been inserted into the system drive slot remains non-exported and is not used as a system drive even though the pulled user drive is no longer considered "consumed" and a member of the RAID group since the pulled user drive has now been replaced with the spare drive (which is now recognized as consumed and a member of the RAID group).

As indicated by 110c, when the user drive (such as belonging to a configured RAID group) is pulled and inserted into a system drive slot and the predetermined amount of time has elapsed, the system has already replaced the pulled consumed user drive of the configured user RAID group with a spare drive. In this case 110c, the data storage system may implement features as described in FIG. 3B and therefore determine the inserted drive as a new drive. The inserted drive is no longer recognized as a consumed user drive because it has lost is membership within the user RAID group as a result of previously being replaced by the spare drive. In the case 110c, the inserted drive (formerly a consumed user drive) is now recognized as a new drive and is exported for use as a system drive.

With reference to the second case corresponding to 112 the user operation 112a may be to pull a system drive, insert the system drive into a user drive slot and insert a new drive into the system slot.

Element 112b denotes a first sequential ordering of the foregoing steps as follows:
Step A1: Pull a system drive,
Step B1: Insert new drive into the system slot.
Step C1: Insert the pulled system drive into a user drive slot.

Element 112c denotes a second different sequential ordering of the foregoing steps as follows:
Step A1: Pull a system drive,
Step C1: Insert the pulled system drive into a user drive slot.
Step B1: Insert new drive into the system slot.

Thus, in 112b, the ordering in which steps B1 and C1 are performed are the reverse from that as in 112c.

Consistent with the features and processing as in FIGS. 3A-3B, a system may protect a system drive from being erased when it is inserted into a user drive slot. Additionally, when a new drive or an unconsumed user drive (i.e., the drive which is not consumed or is not a member of any user RAID group) is inserted into the system drive slot, it will be consumed as a new system drive, replacing the original one.

Given the foregoing features performed in a data storage system and with reference to the particular ordering of steps in 112b, when the user first inserts the new drive into system slot (step B1), the new drive is consumed as a new system drive which is exported to the user. In other words, the new drive that is inserted is now recognized or identified as the system drive and the pulled system drive loses its identity as the system drive (e.g., the pulled system drive has been replaced by the new drive now recognized as the system drive). Subsequently, the user then performs step C1 and inserts the pulled system drive (no longer recognized as a system drive) into the user drive slot. As a result of step C1 in 112b, the system drive inserted into the user drive slot is now recognized as a new drive (since the data storage system has replaced the pulled system drive with a new system drive in step B1 and therefore no longer recognizes the drive inserted into the user drive slot in step C1 as a system drive.

However, with reference to 112c, assume the ordering of steps B1 and C1 are now reversed so a user first inserts the system drive into the user slot (step C1) prior to inserting a new drive into the system drive slot (step B1). After performing step C1 where the system drive is inserted into the user drive slot, the data storage system determines that the inserted drive is a system drive and is therefore not exported to the user for use as a user drive. Assuming that step B is now performed where the user inserts the new drive into the system slot, the new drive is consumed and used as a new system drive. Since event processing for each of the foregoing drives is performed independently, which means the original system drive in the user slot is not checked when the new drive is consumed as a new system drive, the original system drive inserted into a user drive slot in step C1 remains non-exported though it is not recognized as system drive anymore after completing step B1. This may seem unreasonable to the user.

With reference to the third case corresponding to 114 the user operation 114a may be to swap a system drive and an unconsumed or unconfigured user drive. As described elsewhere herein, an unconsumed user drive may be a drive that has been inserted into a user drive slot but has not yet been configured or provisioned into a user RAID group. Thus, an unconsumed user drive may be distinguished from a new drive in that a new drive may not be recognized as having previously been located in a particular user drive slot or a system slot. With 114a, the system drive is located in a system drive slot and the unconsumed user drive is located in a user drive slot and the physical slot locations of the foregoing two drives may be swapped.

Element 114b denotes a first sequential ordering of the foregoing steps as follows:
Step A2: Pull a system drive from a system drive slot and pull the unconsumed user drive from the user drive slot.
Step B2: Insert unconsumed user drive into the system slot (of the pulled system drive).
Step C2: Insert the pulled system drive into a user drive slot (of the unconsumed user drive).

Element 114c denotes a second different sequential ordering of the foregoing steps as follows:
Step A2: Pull a system drive from a system drive slot and pull the unconsumed user drive from the user drive slot.
Step C2: Insert the pulled system drive into a user drive slot (of the unconsumed user drive).
Step B2: Insert unconsumed user drive into the system slot (of the pulled system drive).

Thus, in 114b, the ordering in which steps B2 and C2 are performed are the reverse from that as in 114c.

Consistent with the features and processing as in FIGS. 3A-3B, a system may protect a system drive from being erased when it is inserted into a user drive slot. Additionally, when a new drive or an unconsumed user drive (i.e., the drive which is not consumed or is not a member of any user RAID group) is inserted into the system drive slot, it will be consumed as a new system drive, replacing the original one.

Given the foregoing features performed in a data storage system and with reference to the particular ordering of steps in 114b, when the user first inserts the unconsumed user drive into system slot (step B2), the unconsumed user drive is consumed as a new system drive which is exported to the user. In other words, the unconsumed user drive that is inserted is now recognized or identified as the system drive and the pulled system drive loses its identity as the system drive (e.g., the pulled system drive has been replaced by the new drive now recognized as the system drive). Subsequently, the user then performs step C2 and inserts the pulled system drive (no longer recognized as a system drive) into the user drive slot. As a result of step C2 in 114b, the system drive inserted into the user drive slot is now recognized as a new drive (since the data storage system has replaced the pulled system drive with a new system drive in step B2 and therefore no longer recognizes the drive inserted into the user drive slot in step C2 as a system drive.

However, with reference to 114c, assume the ordering of steps B2 and C2 are now reversed so a user first inserts the system drive into the user slot (step C2) prior to inserting the unconsumed user drive into the system drive slot (step B2). After performing step C2 where the system drive is inserted into the user drive slot, the data storage system determines that the inserted drive is a system drive and is therefore not exported to the user for use as a user drive. Assuming that step B2 is now performed where the user inserts the unconsumed user drive into the system slot, the unconsumed user drive is consumed and used as a new system drive. Since event processing for each of the foregoing drives is performed independently, which means the original system drive in the user slot is not checked when the unconsumed user drive is consumed as a new system drive, the original system drive inserted into a user drive slot in step C2 remains non-exported though it is not recognized as system drive anymore after completing step B2. This may seem unreasonable to the user.

With reference to the fourth case corresponding to 116 the user operation 116a may be to swap a system drive and a consumed user drive. With 116a, the system drive is located in a system drive slot and the consumed user drive is located in a user drive slot and the physical slot locations of the foregoing two drives may be swapped. As described elsewhere herein, a data storage system may perform processing to automatically replace a pulled consumed user drive of a RAID group with a spare drive after a predetermined amount of time, such as 5 minutes, has elapsed.

Element 116b denotes results from the following ordering of steps:

Step A3: Pull a system drive from a system drive slot and pull the consumed user drive from the user drive slot.

Step B3: Insert the pulled system drive into a user drive slot (of the consumed user drive).

Step C3: Prior to the predetermined time period elapsing, insert consumed user drive into the system slot (of the pulled system drive).

Consistent with the features and processing as in FIGS. 3A-3B, a system may protect a system drive from being erased when it is inserted into a user drive slot. Additionally, when a new drive or an unconsumed user drive (i.e., the drive which is not consumed or is not a member of any user RAID group) is inserted into the system drive slot, it will be consumed as a new system drive, replacing the original one.

As a result of performing step B3, the inserted system drive is not exported for use as a user drive since it is recognized as a system drive from its prior system drive slot location. As a result of performing step C3, the consumed user drive inserted into the system drive slot is recognized as a consumed user drive of the configured RAID group and is not exported and is not used as a system drive. As a result, neither the system drive nor the consumed user drive are exported for use in their newly inserted slots.

Element 116c denotes two different results that may occur for different sequential ordering of steps where one of the steps includes inserting the consumed user drive into the system slot (of the pulled system drive) AFTER the predetermined time period has elapsed whereby, as described above, after the time period elapses, the data storage system automatically replaces the pulled consumed user drive with a spare drive.

Element 116c denotes a first variation that results from the following ordering of steps:

Step A4: Pull a system drive from a system drive slot and pull the consumed user drive from the user drive slot.

Step B4: Insert the pulled system drive into a user drive slot (of the consumed user drive).

Step C4: AFTER the predetermined time period has elapsed, insert consumed user drive into the system slot (of the pulled system drive).

Element 116d also denotes a second different sequential ordering of the foregoing steps as follows:

Step A4: Pull a system drive from a system drive slot and pull the consumed user drive from the user drive slot.

Step C4: AFTER the predetermined time period has elapsed, insert consumed user drive into the system slot (of the pulled system drive).

Step B4: Insert the pulled system drive into a user drive slot (of the consumed user drive).

Thus, in 116c, the first and second variations have different orderings for performing steps B4 and C4 as compared to 116d.

Consistent with the features and processing as in FIGS. 3A-3B, a system may protect a system drive from being erased when it is inserted into a user drive slot. Additionally, when a new drive or an unconsumed user drive (i.e., the drive which is not consumed or is not a member of any user RAID group) is inserted into the system drive slot, it will be consumed as a new system drive, replacing the original one.

Given the foregoing features performed in a data storage system and with reference to the particular ordering of steps in 116c, a user first inserts the system drive into the user slot (step B4) prior to inserting the consumed user drive into the system drive slot after the predetermined time period has elapsed (step C4). After performing step B4 where the system drive is inserted into the user drive slot, the data storage system determines that the inserted drive is a system drive and is therefore not exported to the user for use as a user drive. Assuming that step C4 is now performed where the user inserts the consumed user drive into the system slot after the time period has elapsed. Thus, when C4 is performed, the system has already replaced the consumed user drive with a spare drive and thus the consumed user drive now being inserted is no longer recognized by the system has being a consumed user drive. Rather, the consumed user drive now being inserted is recognized as a new drive (e.g., neither recognized as a user drive nor a system drive) and exported to the user for use as a new system drive.

With reference to 116d, when the user first inserts the consumed user drive into system slot after the predetermined time has elapsed (step C4), the system has already replaced the consumed user drive with a spare drive. Thus, the system no longer recognizes the inserted drive as a consumed user drive but rather as a new drive that is exported to for use as a new system drive. Similarly, as a result of performing C4, the pulled system drive also loses its identity as a system drive due to the new system drive recognition just described. After performing step C4, step B4 is performed in which the pulled system drive is inserted into the user drive slot. The previously pulled system drive now being inserted is no longer recognized as a system drive and is therefore recognized and exported as a new consumed user drive that is a member of the RAID group. The new user drive may be initialized with data of the RAID group so that new user drive may be used to service I/Os directed to the RAID group.

To avoid inconsistent or confusing behavior and also avoid unexpected data loss and/or data unavailability, an embodiment in accordance with techniques herein may use deferred drive processing to associate processing of events across different drives. With deferred drive processing, when the data storage system software receives a drive online event notification, it is determined whether the current event can be processed at the current time. The data storage system software may not be able to determine any action to take in response to the event occurrence yet. For example, determination of how to process the current event and drive coming online requires additional information such as related to another subsequent event that has not yet occurred.

As a variation to the foregoing, the data storage system may be able to process the current event of the drive coming online at the current time and, additionally, there may be multiple possible actions that can be taken whereby selection of which action to perform (e.g. action regarding how to process or handle the event) is dependent on, or may vary with, a future subsequent event that has not yet occurred. Thus, at the current point in time with only the current event of drive online having occurred, a selection of which of the multiple actions to take is deferred until such time that the future subsequent event occurs thereby enabling selection of one of the multiple actions. Deferred drive processing is described in more detail in following paragraphs In an embodiment which performs deferred drive processing, two types of queues may be utilized. A first type of queue may be referred to as the drive processing queue including entries each representing an event occurrence for a drive which needs to be processed. When a drive is inserted into a physical slot in the data storage system, hardware discovers the drive and sends a drive online event notification with the drive's information to software on the data storage system to process or handle the drive online event occurrence of the drive. The event notification may include information regarding the event, such as, for example, information about the drive causing the event. When the software receives the event notification, the software performs processing to create an entry in the drive processing queue. An entry in the drive processing queue may also be referred to as a drive element whereby the drive element is a data structure including information about the drive for which the online event notification has been generated. The drive element may include information about the drive such as, for example, the drive's serial number, location or physical position (e.g., slot position), drive storage capacity, drive type (e.g., flash or solid state drive, SAS, NL-SAS, SATA, FC (Fibre channel)) and the like. The drive element may, more generally, also include information which generated by the data storage system for usage internally by the data storage system and its processing software.

A second type of queue may be referred to as a deferred drive queue which includes entries each representing an event occurrence for a drive which needs to be processed and, additionally, where such processing has been deferred. In some cases, when software performs processing to handle the online drive event occurrence, such code may not able to determine how to process the drive event or may be unable to perform any action at the current time with the event occurrence until additional information associated with a subsequent event is obtained. Alternatively, the code may be able to perform an action, such as may be able to select one of multiple possible actions to perform. In this case, a determination may be made to perform a default action in response to the event occurrence for the drive. However, if another subsequent event occurs, the selected action performed needs to be changed to a different action and associated processing. The subsequent event may be an associated or related event with respect to the drive online event notification for the drive. The subsequent event may be, for example, another associated drive coming online or associated drive activity of another drive occurring. Thus, a current event, such as the drive online notification, which may be so characterized may be placed in the deferred drive queue to wait for the occurrence of the subsequent related event before processing the current event.

In an embodiment, there may be multiple deferred drive queues each associated with a different type or classification of drive event. For example, there may be a first deferred drive queue associated with new drive online events and a second queue associated with drive sparing events. A drive element waiting for an occurrence of an event of type I to occur may be placed on the deferred drive queue associated with event type I. When an activity or processing completes causing generation of event type I, the deferred drive queue associated with event type I may be searched to locate the drive for processing whose processing had previously been deferred. To further illustrate, when a drive sparing activity finishes, the above-mentioned second queue may be searched to find the deferred drive which needs to be processed.

Figure 5:
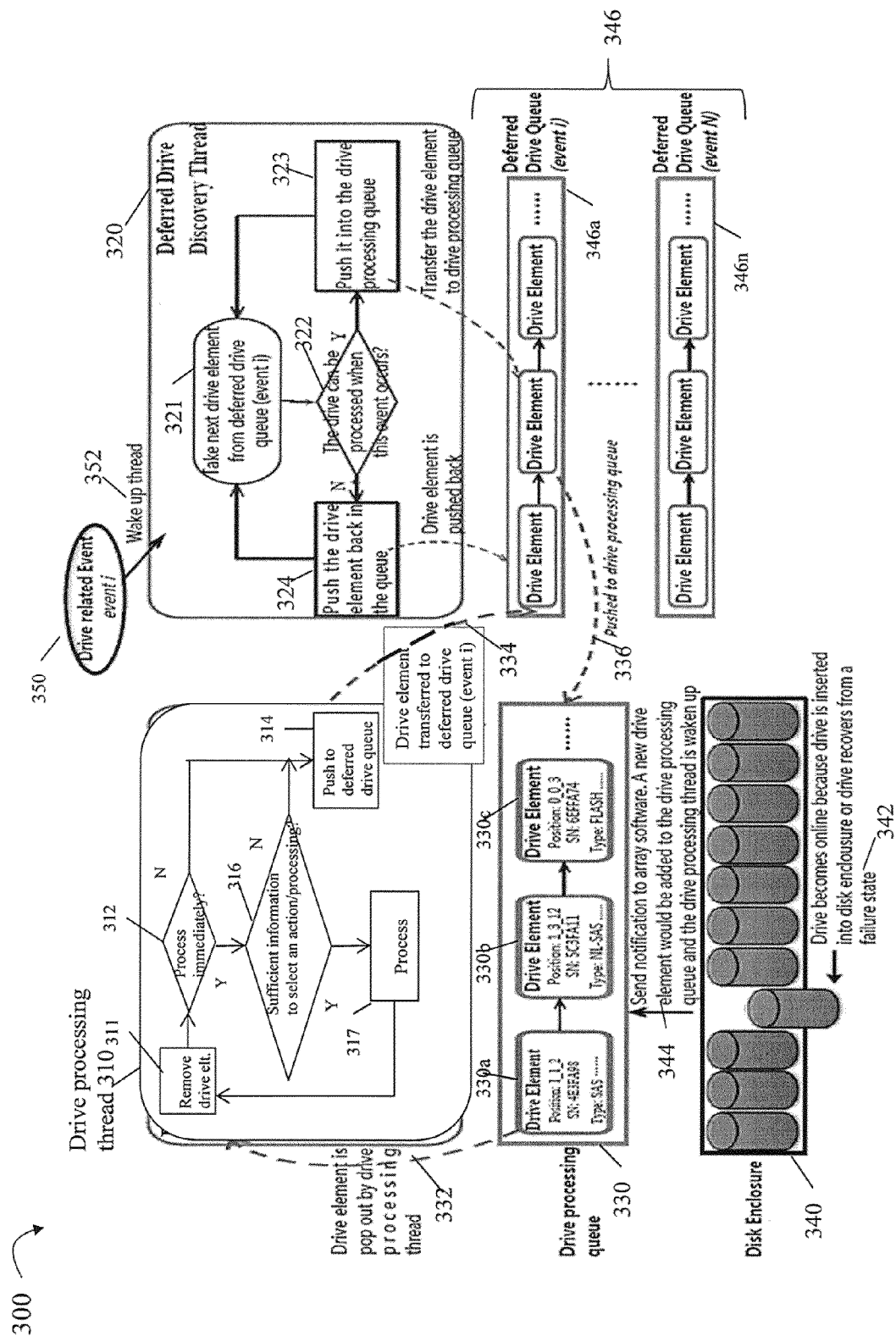
FIG. 5 is an example illustrating deferred drive processing and data structures that may be used in an embodiment in accordance with techniques herein.

Referring to FIG. 5, shown is an example of a flow diagram with processing logic and associated data structures that may be used in an embodiment in accordance with techniques herein. The example 300 illustrates deferred drive processing logic described in more detail below that may be performed in a data storage system in an embodiment.

The example 300 includes disk enclosure 340, drive processing queue 330, drive processing thread 310, deferred drive discovery thread, and deferred drive queues 346a-n (denoted in the aggregate by 346). Drive processing queue 330 is the first type of queue as described above which includes a drive element for each drive for which a drive online event notification has occurred. The drive processing queue 330 includes drive elements 330a-330c. Consistent with description elsewhere herein, drive element 330a includes information identifying the particular drive for which a drive online event notification has occurred. Drive element 330a identifies a first drive located at position 1, 1, 2, having serial number 4E3FA98, identifies the first drive as a SAS drive, and the like. Similarly, drive elements 330b-c may include identifying information regarding represented drives for which drive online event notifications have occurred and which are awaiting processing by drive processing thread 310. The information in the drive element for a drive may also identify whether the drive was inserted into a system slot location or a user drive slot location in addition to identifying the particular system slot or user slot.

Element 346 represents queues of the second type mentioned above. Element 346 includes the multiple deferred drive queues 346a-n each representing a different type of drive event. Each deferred drive queue 346a-n may include drive elements representing drives for which processing has been deferred until the occurrence of another event. A first drive element representing a first drive which is on a first deferred drive queue associated with event type I indicates that the first drive's processing (e.g., the processing of the previous drive online event notification) has been deferred until the subsequent occurrence of another dependent or related event of type I.

As illustrated by 342, a drive may be inserted into the disk enclosure 340 of the data storage system, or a drive may recover from a failure. As illustrated by 344, responsive to the foregoing event occurrence, a drive online notification with the drive's information may be sent to software executing in the data storage system. The executing code may allocate a drive element and place the drive element in the drive processing queue 330. At the same time, the drive processing thread 330 is awakened. As illustrated by 332, the drive processing thread removes 311 one drive element from the drive processing queue and begins to process the drive identified by the drive element. As represented by the processing logic of 310, the drive element may be placed into the deferred drive queue corresponding to event i if either of the following is true:

1. The drive processing thread cannot determine how to process the drive represented by the current drive element until event i occurs.

2. The thread is able to process the drive represented by the drive element but the processing performed has to be changed when and if event i subsequently occurs.

The processing logic of 310 may be further explained as follows. In step 311, a drive element is selected from the drive processing queue 330. At step 312, a determination is made as to whether the drive represented by the selected drive element can be processed at the current time. The particular criteria used to determine whether to process the event and associated drive represented by the drive element at the current time, or whether to defer such processing, may vary with system and embodiment. For example, the criteria may include determining whether any additional information regarding future event occurrences or activities is needed in order to process the current drive online event represented by the drive element being processing. If so, then step 312 would evaluate to no.

If step 312 evaluates to no, control proceeds to step 314 where the drive element is placed in the appropriate deferred drive queue for event I, whereby the drive represented by the drive element can be processed once a subsequent event of type I occurs. If step 312 evaluates to yes, and one or more actions or alternative processing may be performed for the drive, control proceeds to 316. In step 316, a determination is made as to whether there is sufficient information at the current time to select one particular action, from the one or more possible actions, to be performed. Step 316 may evaluate to no, for example, if additional information is needed in order to select an action and processing to be performed. The additional information may be for example, information in connection with one or more subsequent events that have not yet occurred. If step 316 evaluates to no, control proceeds to 314 where the current drive element is placed on the deferred drive queue for event I (as described above). As noted above, the particular deferred drive queue upon which a drive element is placed in step 314 may depend upon the drive element itself and the particular event occurrence represented by the drive element and may also depend upon the state of the system, such as the state of other drives, drive slots, and the like. If step 316 evaluates to yes, control proceeds to step 317 to process the current drive and associated drive element. From step 316, control proceeds to step 310 to process a next drive element, if any, in the drive processing queue 330.

At a later point in time, an event occurs. For example, at a later point in time, drive related event i 350 (e.g. drive sparing) occurs, which wakes up (352) the deferred drive discovery thread 320. This thread 320 then searches the deferred drive queue 346a corresponding to event i 350 to determine the drive(s) denoted by drive elements in queue 346a which can be processed now that this specific event 350 has occurred. The matched one or more drive elements are then placed 336 into the drive processing queue 330 and the drive processing thread 310 is awakened. Then drive processing thread may then processes the drive element(s) just moved to the drive processing queue 330 based on the current system state after event i occurs.

It should be noted that processing performed by the deferred drive discovery thread 320 may also include updating the one or more matched drive elements moved from one of the deferred drive queues 346 to the drive processing queue 330. Such updating may include updating information of the matched drive element to include additional or modified information in accordance with the particular event that has occurred as matched to the drive element.

Processing performed by the deferred drive discovery thread 320 may be described further as follows where the thread is searching a deferred drive queue for event type I and there has been an occurrence of an event of type I. At step 321, the thread may select a next drive element from the deferred drive queue of event type I. At step 322, a determination is made as to whether the current drive element may now be processed as a result of the occurrence of the event of type I. If step 322 evaluates to yes and it can now be processed, control proceeds to step 323 where the current drive element is placed in the drive processing queue. Control then proceeds to step 321 If step 322 evaluates to no and the current drive element cannot be processed yet, control proceeds to step 324 where the drive element remains on the deferred drive queue for event type I and then control proceeds to step 321 to process any remaining drive elements. As will be appreciated by those skilled in the art, thread 320 may stop processing drive elements when all elements in the particular deferred drive queue for event type I have been examined. It should be noted that step 322 may be characterized as determining a match or correspondence between the event occurrence of type I and one or more drive elements included in the deferred drive queue for event type I. Such a match or correspondence may represent that the event occurrence of type I relates to a previous event corresponding to the matching drive element (e.g., previous drive online event). A match may be determined between event information (for the occurrence of event I) and drive element information of the drive elements included in the deferred drive queue for event type I.

An embodiment utilizing the deferred drive processing as just described in connection with drive-related events may provide the users with a more consistent result and experience when performing drive operations. Furthermore, use of such techniques in an embodiment which also performs processing and supports features such as described in FIGS. 3A-B provides for eliminating the risk of data loss and data unavailability that may otherwise result as described, for example, in connection with cases of FIG. 4. To further illustrate, discussion now reconsiders the exemplary cases and user experience previously described in connection with FIG. 4 with the difference now of performing deferred drive processing in a data storage system.

Figure 6:
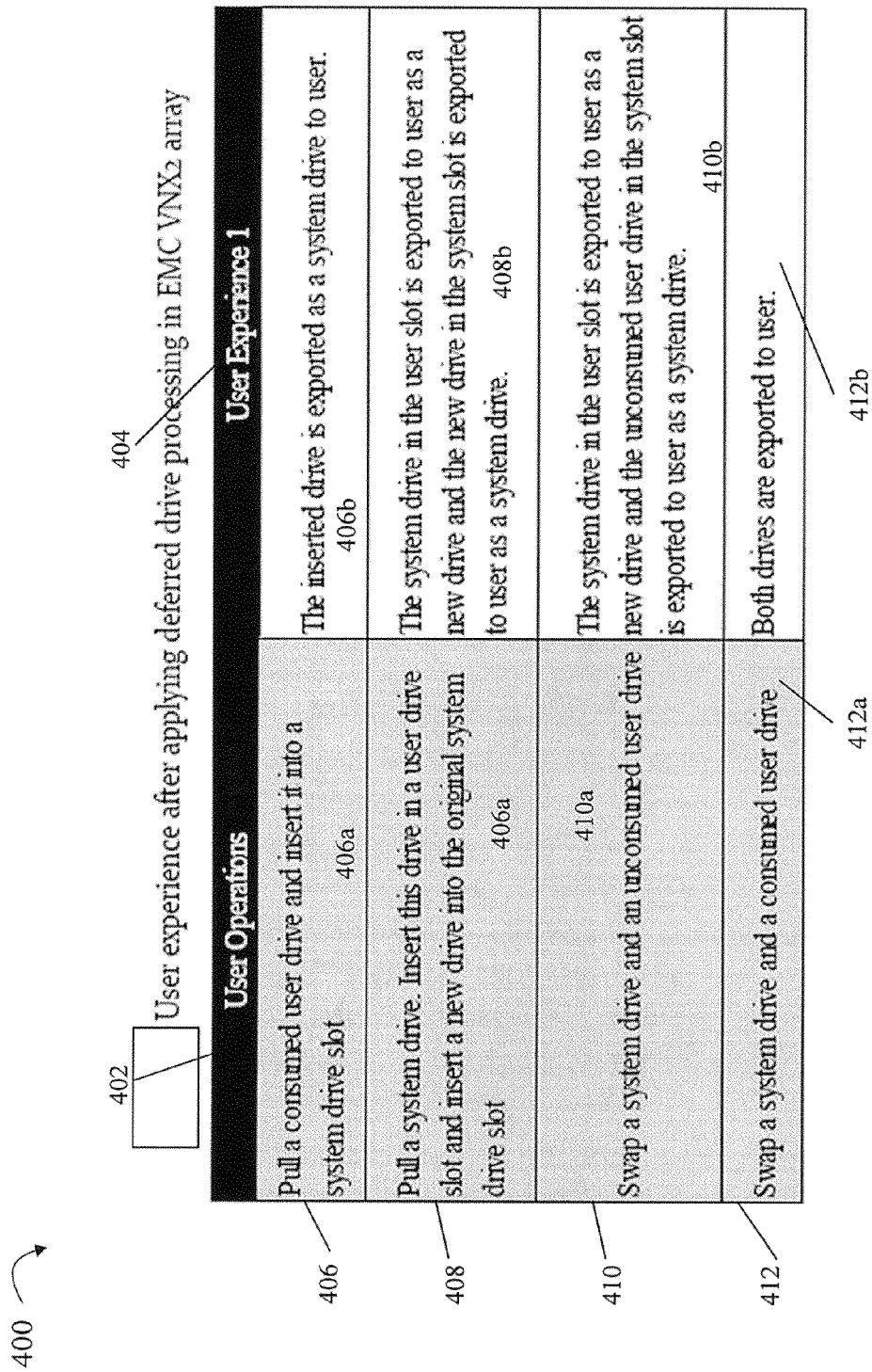
FIG. 6 an example of different scenarios or cases and different results that may be obtained in a data storage system utilizing deferred processing techniques herein.

With reference to FIG. 6, shown is a table 400 various examples of cases and results that may be obtained in an embodiment in accordance with techniques herein using deferred drive processing.

The following examples may be consistent with a data storage system which also performs processing consistent with discussions above regarding functionality of FIGS. 3A and 3B.

The table 400 includes 4 example cases or scenarios that may occur. The cases in table 400 correspond to those previously described above in connection with FIG. 4. Each of the four cases is represented by information in a single row of table 400. Table 400 includes a first column 402 identifying the user operations performed for the particular case, and a second column 104 identifying a result or behavior experience in response to the user operations indicated in column 102 of the same row.

With reference to the first case or scenario corresponding to 406, the user operation 406a may be to pull a consumed user drive and insert the consumed user drive into a system slot. Previously described above with reference to row 110 of FIG. 4, a user experienced different resulting behavior that may vary with the amount of time between when the consumed user drive is pulled and when it is inserted into the system slot. In a system which performs automatic sparing, after a predetermined amount of time elapses from when a consumed user drive of a RAID group is pulled, the system automatically selects a spare to become a new user drive of the configured RAID group thereby replacing the pulled user drive. As described above in connection with line 110 of FIG. 4, the user experiences different results depending on whether the amount of elapsed time between pulling and inserting the user drive exceeds the predetermined amount of time (after which sparing occurs). Now, in an embodiment with deferred drive processing as in FIG. 5, a user experiences the same result regardless of whether the amount of elapsed time exceeds the predetermined amount of time, or not.

Consider the first variation of the first case where the pulled consumed user drive is inserted into the system drive slot and the predetermined amount of time has not elapsed. In this case, the consumed user drive has not yet been replaced by a spare drive in the user RAID group. When the consumed user drive is inserted, the drive online event notification is received and a drive element is allocated and placed in the drive processing queue 330. The drive processing thread 310 processes the drive element and determines that the drive's identity is a consumed user drive which has been placed in a system drive slot. This may be determined, for example, based on the location information of the drive element which may denote a system slot location. Additionally, the drive element includes information, such as a serial number which corresponds to identifying information of a consumed user drive of a configured user RAID group. When the user RAID group was previously configured, the data storage system previously stored information, such as drive serial number, type, etc., used to uniquely identify each of the particular user drives. Now, the system may determine that one such consumed user drive is identified by the drive element being processed whereby the consumed user drive is located in the system slot. At this point, the inserted drive's identity is determined as a consumed user drive that has been inserted into a system slot so the inserted drive is not exported for use as a system drive. The executing code determines that after the predetermined amount of time has elapsed, the consumed user drive will be replaced later by a spare drive thereby allowing the consumed user drive to be used as a system drive after such subsequent sparing event occurs. Thus, at this point, the thread 310 places the drive element for this user drive into the deferred drive queue corresponding to a spare event.

When the predetermined time period after which sparing occurs has elapsed, the consumed user drive is replaced by a spare drive thereby causing generation of a sparing event. In response to the sparing event, the deferred drive discovery thread 320 is awakened which then searches the deferred drive queue of 346 corresponding to the type of event that has occurred, the sparing event type. The deferred drive discovery thread 320 determines that the drive element corresponding to the consumed user drive can now be processed since the related sparing event (whereby the spare replaced the consumed user drive as a drive member of the configured user RAID group) has occurred. Processing is performed to determine one or more drive elements of the sparing event queue which match the sparing event information. The sparing event information may, for example, identify (e.g., by serial number or other information) the consumed user drive that was replaced by the spare. The drive element in the deferred drive queue for sparing event determined as a match may identify the same drive via matching serial numbers (e.g., serial number of sparing event information matches serial number of drive associated with the drive element). At this point, thread 320 places the drive element for the consumed user drive on the drive processing queue 330 since the event and drive represented by the drive element (e.g., the consumed user drive previously inserted into the system slot) can now be processed given that the subsequent related sparing event has occurred. The drive element moved from one of the deferred drive queues 346 to the drive processing queue 330 may be updated, as needed, to include additional event about the related sparing event that has also now occurred.

Responsive to placing the foregoing drive element in the drive processing queue 330, the drive processing thread 310 again processes the inserted drive element. However, at this point, the drive processing thread 310 determines that the drive represented by the drive element no longer has an identity in the system as a consumed user drive because no user configured RAID group is identified as having this particular inserted drive as a RAID group member. Rather, the drive may be viewed as a new drive that is exported as a new system drive as represented by 406b.

Consider the second variation of the first case where the pulled consumed user drive is inserted into the system drive slot and the predetermined amount of time has elapsed. In this case, the drive represented by the created drive element can be processed immediately and there is no need to place the drive element on a deferred drive processing queue. The inserted drive is no longer recognized as a consumed user drive since the spare drive is now recognized as the RAID group member rather than the inserted drive. Thus, processing proceeds as outlined above and the inserted drive (previously recognized as a consumed user drive but now recognized as a new drive) inserted into the system slot is now exported as a new system drive as represented by 406b. Thus, the behavior or result is the same in both variations (e.g., whether the pulled consumed user drive is inserted into the system slot before or after the predetermined amount of time elapsed between being pulled and inserted).

With reference to the second case or scenario corresponding to 408, the user operation 408a may be to pull a system drive, insert the system drive into a user drive slot and insert a new drive into the system slot. Described above in connection with row 112 of FIG. 4, two variations were described with different results depending on the particular ordering of the steps. A first behavior or result was obtained if the user first inserted the system drive into the user slot, and then secondly inserted the new drive into the system slot. A second different behavior or result was obtained if the foregoing ordering was changed so that the user first inserted the new drive into the system slot and then secondly inserted the system drive into the user drive slot. However, in an embodiment using deferred drive processing, the same result or behavior is obtained regardless of the foregoing ordering. In other words, the same behavior results for both sequences.

To further illustrate, a user pulls a system drive from its system drive slot location. When a user then inserts the system drive into the user slot, processing is described consistent with that of FIG. 5 where a drive element is created for the system drive and placed in the drive processing queue 330. The foregoing drive element is then processed by the drive processing thread 310 which recognizes the inserted drive (inserted into the user drive slot) as a system drive, so it is not exported to user. The system recognizes the inserted drive as a system drive since, previously, the inserted drive was located in the system drive slot and used as a system drive. Information identifying the inserted drive, such as serial number, etc., was stored and associated with its position and use as a system drive. Now the inserted drive is detected as having identifying information matching that of a system drive. The drive processing thread 310 also knows that at a later point in time, an event may occur in which a new drive is inserted into the system drive slot previously occupied by the system drive. When this occurs, the inserted system drive (inserted now in the user drive slot) may be exported and used as a user drive. So, the drive processing thread places the drive element for the inserted system drive into the deferred drive queue corresponding to the new system drive event type.

At a later point in time, the user inserts the new drive into the system slot where the new drive is consumed and exported as a new system drive (as represented in 408*b*). This new system drive event triggers the deferred drive discovery thread to search the deferred drive queue corresponding to new system drive event whereby such searching looks for a drive element matching or corresponding to (e.g., related to) the new system drive event. A match between the new system drive event occurrence and a drive element in the new system drive event queue may be made by determining a match or correspondence between information of the new system drive event occurrence and information of the drive element. For example, the new system drive may be inserted into a particular system slot location previously occupied by the pulled system drive. The new system drive event information may identify the system drive that was replaced (e.g., by serial number of the replaced drive). The matching drive element of the pulled system drive in the deferred drive queue may have the same identifier (denoting the pulled system drive). Processing locates the drive element on the new system drive event queue where the drive element identifies the previous system drive now inserted into the user drive slot, and then places the drive element into the drive processing queue. The drive element moved to the drive processing queue 330 may be updated, as needed, to include additional event about the related new system drive event that has also now occurred. When the drive processing thread processes this drive element again, it determines the drive's identity is a new drive (because its identity as a system drive has been replaced by the new drive inserted in the system drive slot). As a result, the drive (previously recognized as a system drive and now recognized as a new drive that is inserted into the user drive slot) is exported to the user to use as a new user drive as in 408*b*.

Now, consider the ordering variation in 408 where a user pulls a system drive from its system drive slot location and first inserts the new drive into the system drive slot where the new drive is consumed and exported as a new system drive (as represented in 408*b*). With this first step, the drive element corresponding to the event of the new drive being inserted may be processed immediately without placing the drive element in a deferred drive processing queue. Subsequently, the user then inserts the pulled system drive into a user drive slot and the created drive element for this event may also be processed immediately without use of deferred drive queues. The inserted drive is no longer recognized as one of the system drives since the new system drive replaced the pulled system drive after inserting the new drive in the pulled system drive's original system slot. Thus, the previously pulled system drive is now recognized as a new user drive and exported as such to the user, as indicated in 408*b*.

Thus, using deferred drive processing, it can be seen the system behavior for the second case or scenario 408 is the same regardless of the ordering of the following steps: insert new drive into system slot; insert pulled system drive into user drive slot.

With reference to the third case corresponding to 410 the user operation 410*a* may be to swap a system drive, currently located in a system drive slot, and an unconsumed or unconfigured user drive, currently located in a user drive slot. Described above in connection with row 114 of FIG. 4, two variations were described with different results depending on the particular ordering of the steps. A first behavior or result was obtained if the user first inserted the system drive into the user slot (previously occupied by the unconsumed user drive), and then secondly inserted the unconfigured or unconsumed drive into the system slot (previously occupied by the pulled system drive). A second different behavior or result was obtained if the foregoing ordering was changed so that the user first inserted the unconsumed drive into the system slot and then secondly inserted the system drive into the user drive slot (previously occupied by the unconsumed user drive). However, in an embodiment using deferred drive processing, the same result or behavior is obtained regardless of the foregoing ordering. In other words, the same behavior results for both sequences.

Consider a first ordering in which the unconsumed user drive is first inserted into the system drive slot and then the system drive is inserted into the user drive slot. When the unconsumed user drive is inserted into the system drive slot, processing as in FIG. 5 may be performed whereby a drive element is created and placed in the drive processing queue for the unconsumed user drive. The drive processing thread determines that this drive element corresponds to a drive that is not a system drive and is also not recognized as a consumed user drive of any configured user RAID group. Thus, the unconsumed drive can be immediately processed and (as indicated by 410*b*) is exported as a new system drive replacing the pulled system drive (that previously occupied the system slot into which the unconsumed user drive is inserted). At a later point in time, the pulled system drive is inserted into the user drive slot and can be processed immediately without placement on a deferred drive queue. The inserted drive is no longer recognized as a system drive since its role as a system drive has been replaced by the foregoing unconsumed user drive (now recognized as a new system drive). The previously pulled system drive, now inserted into the user drive slot, is recognized as a new drive and is exported as a new (unconsumed) user drive, as indicated by 410*b*.

Now consider a second ordering with 410 in which the system drive is inserted into the user drive slot and then the unconsumed user drive is inserted into the system drive slot. When the system drive is inserted into the user drive slot, processing as in FIG. 5 may be performed whereby a drive element is created and placed in the drive processing queue for the system drive now inserted into the user drive slot. The system recognizes the inserted drive as a system drive and does not export it as a user drive yet. The system knows that the system drive may be later used as a new user drive once a new drive is inserted into the system drive slot (previously occupied by the system drive) thereby replacing the system drive. At this point, the drive element is placed on the deferred drive queue corresponding to the new system drive event type.

At a later point in time, the user inserts the new drive into the system slot (previously occupied by the pulled system drive) where the new drive is consumed and exported as a new system drive (as represented in 408*b*). This new system drive event triggers the deferred drive discovery thread to search the deferred drive queue corresponding to new system drive event. Processing is performed to determine any drive element(s) matching the new system drive event that has occurred. Such processing may be determine a match between new system drive event information and drive element information of drive elements in the deferred drive queue for new system drive events. For example, the new system drive event information may identify the system drive that was placed (e.g. the serial number and/or other identifying information of the replaced system drive). Processing may compare the foregoing new drive event information, such as replaced system drive's serial number, with a serial number and/or other drive identifying information included in with drive elements in the deferred drive queue for new system drive events. A matching drive element has matching or corresponding identifying information with that of the replaced system drive. Processing locates the drive element on the new system drive event queue where the drive element identifies the previous system drive (now inserted into the user drive slot), and then places the drive element into the drive processing queue. The drive element moved from one of the deferred drive queues 346 to the drive processing queue 330 may be updated, as needed, to include additional event about the related new system drive event that has also now occurred. When the drive processing thread processes this drive element again, it determines the drive's identity is a new drive (because its identity as a system drive has been replaced by the new drive inserted in the system drive slot). As a result, the drive (previously recognized as a system drive and now recognized as a new drive that is inserted into the user drive slot) is exported to the user to use as a new user drive as in 410b.

Thus, using deferred drive processing, it can be seen the system behavior for the third case or scenario 410 is the same regardless of the ordering of the following steps: insert unconsumed user drive into system slot; insert pulled system drive into user drive slot.

With reference to the fourth case corresponding to 412 the user operation 412a may be to swap a system drive and a consumed user drive. With 412a, the system drive is located in a system drive slot and the consumed user drive is located in a user drive slot and the physical slot locations of the foregoing two drives may be swapped. As described elsewhere herein, a data storage system may perform processing to automatically replace a pulled consumed user drive of a RAID group with a spare drive after a predetermined amount of time, such as 5 minutes, has elapsed. With deferred drive processing, as denoted by 412b, both drives (system and consumed user drive) are exported to the user for use in their new physical drive slots.

In an embodiment using deferred drive processing such as described above, the same behavior or results 412b may be obtained for both the following first ordering: insert the pulled system drive into the swapped user drive's location and then insert the pulled consumed user drive into the system drive's slot, and second ordering: insert pulled consumed user drive into the system drive's slot and then insert pulled system drive into swapped user drive's location. Additionally, the same result may be obtained as denoted in 412b regardless of whether the amount of time that has elapsed from drive pull to insertion exceeds the predetermined amount of time (after which drive sparing automatically occurs for a pulled consumed user drive).

Consider the first ordering: insert the pulled system drive into the swapped user drive's location and then insert the pulled consumed user drive into the system drive's slot. When the system drive is inserted into the user drive location, processing of FIG. 5 results in creating a drive element which is processed by the drive processing thread 310. The inserted drive is recognized as a system drive and is not exported at this time. However, it is known that the system drive may be exported and used as a new user drive at a later point in time after the system drive has been replaced (e.g. once a new drive or unconsumed user drive has been inserted into the system drive slot previously occupied by the pulled system drive). Thus processing determines to place the drive element on the deferred drive processing queue to wait for a new system drive event.

At a later point in time, the consumed user drive is inserted into the system drive slot. If the predetermined amount of time has elapsed since the consumed user drive was pulled from its user drive slot, sparing has already replaced the consumed user drive so that the inserted consumed user drive (inserted into the system slot) is now recognized as a new drive and is exported and used as a new system drive (as in 412b) and also triggering a new system drive event occurrence. Consistent with FIG. 5 processing, the deferred drive discovery thread 320 is awakened and searches the new system drive event queue for a drive matching the event occurrence. Processing locates a matching drive element for the above-mentioned system drive inserted into the user drive slot. The match may be determined, for example, by matching the new system drive event information with information included in drive elements of the deferred processing queue (for new system drive events). The drive element associated with the pulled system drive is placed into the drive processing queue where the drive element is again processed by the drive processing thread 310.

The drive element moved to the drive processing queue 330 may be updated, as needed, to include additional event about the related new system drive event that has also now occurred. The drive processing thread 310 determines that the drive element can now be processed and the system drive, inserted into the user drive slot in a first event, is determined to have now been replaced by a new system drive in a second subsequent event. Using deferred drive processing, the foregoing first and second events have been matched as related events and collectively viewed in the aggregate to make a decision on how to handle and use the pulled system drive (now inserted into a user drive slot). Thus, the pulled system drive (now inserted into a user drive slot) is recognized as a new drive and exported for use as a new user drive, as in 412b.

As a variation with the first ordering, if the consumed user drive is inserted into the system drive slot and the predetermined amount of time has not elapsed since the consumed user drive was pulled from its user drive slot so that sparing has not yet already replaced the consumed user drive, deferred drive processing places the consumed user drive in the deferred processing queue to wait for the occurrence of a related sparing event whereby the spare replaces the consumed user drive after the predetermined amount of time has elapsed. Once this has occurred, processing may continue as outlined above.

Now, consider use of deferred drive processing with the second ordering for case or scenario four 412: insert pulled consumed user drive into the system drive's slot and then insert pulled system drive into swapped user drive's location. Consider a first variation where the pulled consumed user drive is into the system drive's slot and the predetermined amount of time has not yet elapsed for a spare to have replaced the consumed user drive. In this case, deferred drive processing as in FIG. 5 results in creating a drive element for the pulled consumed user drive which is recognized by the system as a consumed user drive and is not exported at the current time as a system drive. The system knows that the consumed user drive may be later used as a new system drive after the predetermined amount of time has elapsed causing automatic sparing to replace the consumed user drive with a spare drive. The drive element is placed in the deferred drive processing queue for sparing events. At a later point in time after the predetermined amount of time has elapsed the consumed user drive is replaced by a spare drive in the configured RAID group thereby generating a sparing event. The deferred drive discovery thread is awakened and processes the sparing event queue to determine a matching drive element corresponding to that of the pulled consumed user drive. The match may be determined by matching information from the sparing event with that of the drive element. For example, the sparing event may include information identifying the consumed user drive (e.g., serial number, user drive slot location, etc.) that was replaced by the spare. The sparing event information may be compared against information of the drive elements in the sparing event queue to determine any matching drive element(s). In this case, a match is determined and the drive element for the pulled consumed user drive is placed in the drive processing queue for processing again by the drive processing thread. The drive element moved to the drive processing queue 330 may be updated, as needed, to include additional event about the related sparing event that has also now occurred. At this point, it is determined that the drive element representing the pulled consumed user drive (now inserted in the system drive slot) may be exported and used as a new system drive (as in 412b) since the subsequent related sparing event replaced the pulled consumed user drive. It should be note that if the predetermined amount of time had elapsed prior to the consumed user drive being inserted, then the consumed user drive would be recognized and exported as a new system drive (as in 412b) since the spare drive has replaced the consumed user drive.

Subsequently, the pulled system drive is inserted into the user drive slot. Consistent with FIG. 5 processing, a drive element is created and can be processed immediately. At this point, the pulled system drive (now inserted into the user drive slot) has been replaced by the above-mentioned new system drive. The inserted drive is now recognized as a new user drive (as in 412b) and there is no need to place the drive element on a deferred event queue.

Figure 7:
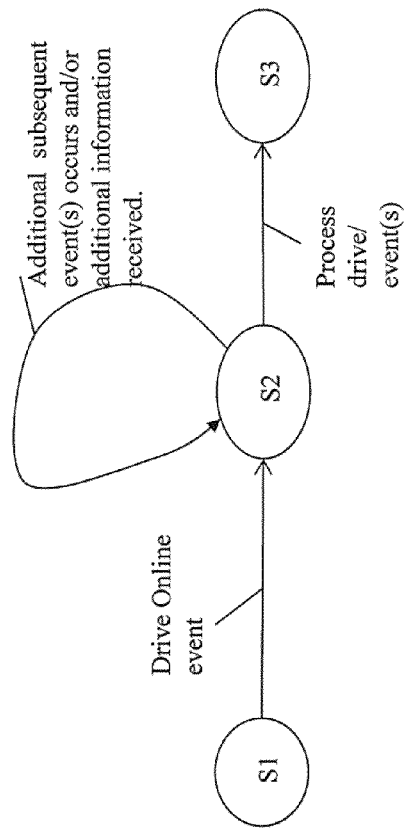
FIG. 7 is an illustration of a state transition diagram representing different drive states in an embodiment in accordance with techniques herein.

Referring to FIG. 7, shown is a state transition diagram that may generally represent event processing in an embodiment in accordance with techniques herein. Generally, described above is deferred event processing with respect to drive events. However, more generally, techniques herein may be performed with respect to other types of events for other resources besides different physical drives. The example 500 includes states S1, S2 and S3 denoted by nodes and transitions between the states denoted by directed arrows. A transition from a first state to a second state is represented by a directed arrow from the first state to the second state. In the example 500, S1 may represent a start state wherein upon the occurrence of a first drive online event, the state for the drive brought online transitions to S2. State S2 may represent the deferred drive processing state. The drive remains in state S2 while waiting for additional events and/or information. For example, a drive transitions from S2 to S2 responsive to a subsequent event occurring upon which the previous first event (drive online event) and associated drive depends. A drive transitions from state S2 to S3 where the processing for the drive and associated events that have occurred may be processed. A transition from S2 to S3 occurs with respect to a drive when no subsequent event occurrence is needed to process the drive and any event(s) for the drive that have occurred.

An embodiment may implement the techniques herein using code executed by a processor. For example, an embodiment may implement the techniques herein using code which is executed by a processor. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media (also referred to as computer readable media or medium) may include, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing events comprising:
receiving a first notification regarding an occurrence of a first event identifying a first physical drive coming online;
determining whether the first event is dependent on one or more other events that have not yet occurred;
if it is determined that the first event depends on the one or more other events that have not yet occurred, performing first processing to defer processing of the first event until the one or more other events have occurred; and
if it is determined that the first event does not depend on the one or more other events that have not yet occurred, processing the first event.

2. The method of claim 1, wherein the drive online notification is generated in response to any of a drive being inserted into a drive slot or a drive in the drive slot recovering from an error state.

3. The method of claim 1, wherein the first processing includes creating a first entry in a first of a plurality of deferred drive processing queues, said first entry identifying the first event and the first physical drive.

4. The method of claim 3, wherein the plurality of deferred drive processing queues is associated with a plurality of types of drive events, each of the plurality of deferred drive processing queues being associated with a different one of the plurality of types of drive events.

5. The method of claim 4, wherein the first deferred drive processing queue is associated with a first type of drive event included in the plurality of types of drive events and wherein placing the first entry in the first deferred drive processing queue indicates that the processing of the first event and first physical drive depends on an occurrence of a second event of the first type of drive event.

6. The method of claim 5, further comprising:
receiving a second notification regarding an occurrence of a second event of the first type of drive event;
determining whether any event having a corresponding entry in the first deferred drive processing queue is able to be processed as a result of the second event occurring; and
if it is determined that an event having a corresponding entry in the first deferred drive processing queue is able to processed as a result of the second event occurring, placing the event able to now be processed in a drive processing queue for processing.

7. The method of claim 6, wherein determining whether the first event having the first entry in the first deferred drive processing queue is able to be processed as a result of the second event occurring includes determining whether first information regarding the first event matches second information regarding the second event.

8. The method of claim 7, wherein the plurality of types of drive events includes any of a new system drive event, a sparing event, and a new user drive event.

9. The method of claim 8, wherein the first type of drive event is a sparing event, and wherein the second notification is generated responsive to a sparing event occurrence whereby a spare physical drive automatically replaced another physical drive that was previously configured as a member of a RAID group for storing user data.

10. The method of claim 8, wherein the first type of drive event is a new system drive event and wherein the second notification is generated responsive to a new physical drive being inserted into a system drive slot for use as a system drive in a data storage system.

11. The method of claim 8, wherein the first type of drive event is a new user drive event and wherein the second notification is generated responsive to a new physical drive being inserted into a user drive slot for use as a user drive in a data storage system.

12. The method of claim 11, wherein the new physical drive is configured as a drive of a RAID group for storing user data thereby making the new physical drive a consumed user drive.

13. The method of claim 10, wherein the system drive is used internally by the data storage system and does not store user data.

14. The method of claim 3, wherein said first entry identifying the first event and the first physical drive includes any of a serial number identifying the first physical drive, a capacity of the first physical drive, information identifying a drive type of the first physical drive, information identifying whether the first physical drive is inserted in a system drive slot or a user drive slot, and a physical slot location in which the first physical drive is inserted.

15. A computer readable medium comprising code thereon for processing events, the computer readable medium comprising code for:
receiving a first notification regarding an occurrence of a first event identifying a first physical drive coming online;
determining whether the first event is dependent on one or more other events that have not yet occurred;
if it is determined that the first event depends on the one or more other events that have not yet occurred, performing first processing to defer processing of the first event until the one or more other events have occurred; and
if it is determined that the first event does not depend on the one or more other events that have not yet occurred, processing the first event.

16. The computer readable medium of claim 15, wherein the drive online notification is generated in response to any of a drive being inserted into a drive slot or a drive in the drive slot recovering from an error state.

17. The computer readable medium of claim 15, wherein the first processing includes creating a first entry in a first of a plurality of deferred drive processing queues, said first entry identifying the first event and the first physical drive.

18. The computer readable medium of claim 17, wherein the plurality of deferred drive processing queues is associated with a plurality of types of drive events, each of the plurality of deferred drive processing queues being associated with a different one of the plurality of types of drive events.

19. The computer readable medium of claim 18, wherein the first deferred drive processing queue is associated with a first type of drive event included in the plurality of types of drive events and wherein placing the first entry in the first deferred drive processing queue indicates that the processing of the first event and first physical drive depends on an occurrence of a second event of the first type of drive event.

20. The computer readable medium of claim 19, where the computer readable medium further comprises code for:
receiving a second notification regarding an occurrence of a second event of the first type of drive event;
determining whether any event having a corresponding entry in the first deferred drive processing queue is able to be processed as a result of the second event occurring; and
if it is determined that an event having a corresponding entry in the first deferred drive processing queue is able to processed as a result of the second event occurring, placing the event able to now be processed in a drive processing queue for processing, and wherein determining whether the first event having the first entry in the first deferred drive processing queue is able to be processed as a result of the second event occurring includes determining whether first information regarding the first event matches second information regarding the second event.

* * * * *